Nov. 10, 1970     G. EKSTEDT ET AL     3,538,562

DEVICE FOR DIVIDING PLASTIC BLOCKS

Filed Feb. 15, 1968     2 Sheets-Sheet 1

INVENTORS
GÖSTA EKSTEDT
PER-ERIK SÖDERLUND

BY *Larson and Taylor*

ATTORNEYS

Nov. 10, 1970   G. EKSTEDT ET AL   3,538,562
DEVICE FOR DIVIDING PLASTIC BLOCKS
Filed Feb. 15, 1968   2 Sheets-Sheet 2

INVENTORS
GÖSTA EKSTEDT
PER-ERIK SÖDERLUND

BY Larson and Taylor

ATTORNEYS

United States Patent Office 3,538,562
Patented Nov. 10, 1970

3,538,562
DEVICE FOR DIVIDING PLASTIC BLOCKS
Gösta Ekstedt, Stockholm, and Per-Erik Söderlund, Saltsjobaden, Sweden, assignors to Ytong International AB, Stockholm, Sweden
Filed Feb. 15, 1968, Ser. No. 705,818
Int. Cl. B28b 11/14; B26d 4/02
U.S. Cl. 25—107                 9 Claims

ABSTRACT OF THE DISCLOSURE

A cutting apparatus for cutting plastic blocks of uncured lightweight concrete includes a rotatable support for a series of cutting frames. These frames each include a plurality of cutting wires of different predetermined spacings for dividing the blocks into desired sizes. In operation, a cutting frame having a selected spacing between the wires may be simply rotated to a cutting position, thus obviating the need for reposting of the wires between cutting cycles.

BACKGROUND OF THE INVENTION

Field of the invention

The present invention relates to cutting devices and more particularly to cutting devices for cutting plastic blocks of cast, uncured lightweight concrete into smaller sizes.

The prior art

The production of lightweight concrete is conventionally carried out by feeding a number of molds through a casting station at which the molds are filled with material used in producing the lightweight concrete. After the mold is filled the concrete mass is permitted to stiffen for a brief time so as to form a block of generally plastic consistency. The plastic block is then transferred to a cutting station where it is divided into building units of the desired dimensions. In a final step the divided block is steam cured in an autoclave in order that the final strength may be obtained rapidly and that shrinkage of the lightweight concrete is diminished. Molds suitable for use in the above described process are generally quite large, a typical mold having the dimensions of 60 x 120 x 600 centimeters. Thus it will be appreciated that a block produced by such a mold has a volume greatly exceeding the volume of the largest building unit found on the market. Because of this the block must be divided in at least one direction so as to produce units of a usable size. In actual practice, in order to obtain completely plane and accurately sized surfaces, the mass block is generally divided in all three mutually perpendicular directions of the cartesian coordinate system, i.e., along its height, width and length.

The most common method of providing division of the basic mass block involves passing a number of spaced cutting wires therethrough. The wires are fixed in a cutting frame which may be passed through a stationary block or fixed such that the block passes through the cutting frame. Combinations of these two procedures have also been utilized and thus it is possible where dividing the block in a first direction to pass the cutting frame through a stationary block while for division in a second direction to pass the block through a fixed frame.

The cutting frames referred to above generally comprise a pair of spaced parallel bars between which the wires are fixed. Where the wires are tightly stretched between the bars of the cutting frame they are referred to as "cutting" wires whereas where the wires are arranged for back and forth movement along the longitudinal axes thereof they are referred to as "sawing" wires. It is noted that for purposes of the present specification and claims the term "cutting" wires will refer to wires of both types. The cutting wires are of the "piano-wire" type, that is, the diameters thereof do not exceed about one millimeter. The spacing of the wires will of course be determined by the dimensions of the building units desired. As set forth hereinbefore the volume of the block produced at the casting station may range between three and four cubic meters and thus such a block may be divided into building units of greatly varying sizes. To produce different sized blocks it is obviously necessary to vary the spacing of the cutting wires and this variation is commonly accomplished through the use of rings located on opposite ends of the cutting wires which are adapted to be removably secured to support elements mounted on the bars of the cutting frames. These support elements, which are generally in the form of knobs or studs, are arranged in a row along the length of the bars at short distances from one another, e.g., at spacings of five or ten millimeters. The great number of support knobs provided and the closeness of the spacing therebetween provide for an almost unlimited number of possible spacings between the wires. Further, because of the relative ease of removal of the wires from the support knobs provided by the ring and knob arrangement the spacing of the wires may be varied fairly rapidly. This process of changing the spacing of the wires is known in the art as "reposting."

The rapidity with which reposting can be accomplished is a very important consideration in the dividing process. Because of the great sizes of the mass blocks and because of the great number of different sizes of building units required, the number of mass blocks that are divided in exactly the same way is generally very small. It may well be that each subsequent block delivered to the dividing station is to be divided in a manner different from the preceding one. It will of course be appreciated that under these latter circumstances reposting of the wires is necessary after the division of each mass block.

Although, as set forth hereinbefore, the reposting time required with the knob and ring arrangement described is relatively short it has been found that this time is still too great to permit the use of such an arrangement in a procedure utilizing modern assembly line techniques. For example, in certain factories the time to prepare a block for division has been reduced to approximately five minutes. With this reduction in time for preparation of the block for division, it will be appreciated that where every second block is to be divided into sizes different from that of the preceding block it is necessary to provide means for changing the spacing of the wires during a period equal to the time required for preparing the block, i.e., five minutes, less the time required for the actual dividing process. The dividing process requires approximately three or four minutes and thus only one or two minutes are left for reposting of the wires. This situation is further complicated by the fact that where the block is to be divided in all three directions the wires corresponding to each of these directions must also be reposted and thus the required reposting time is tripled. Thus there may be many situations where insufficient time is provided for reposting and thus an undesirable bottleneck exists at the cutting station which causes expensive delays in the assembly line process.

BRIEF SUMMARY OF THE PRESENT INVENTION

In accordance with the present invention a cutting device of the type described is provided which eliminates any reposting delays. The device of the invention is operable completely independent of the particular technique utilized in the division process, i.e., whether the mass passes through fixed cutting wires or the cutting wires pass through a stationary mass.

In accordance with a presently preferred embodiment of the invention the cutting apparatus comprises a plurality of cutting frames, each of the frames including a plurality of cutting wires supported in a predetermined spaced relationship. The spacing between the wires is varied for each frame in accordance with the requirements of the building units to be produced. The frames are rotatably mounted so that a particular cutting frame having cutting wires of a selected predetermined spacing may be rotated into a cutting position. In this way the need for reposting after each cutting cycle is eliminated in that a new frame corresponding to the division requirements of the subsequent block may be rotated into position after division of the preceding block has taken place. It is preferable to utilize at least three cutting frames in that this multiplies by three the available spacings of the cutting wires as well as doubles the time for necessary reposting in that where three frames are used one frame will be in a non-cutting position during at least two cutting cycles and thus the reposting time available during these two cycles may be utilized.

BRIEF DESCRIPTION OF THE DRAWINGS

Other features and advantages of the present invention will be apparent upon consideration of the following description of the invention taken with the corresponding drawings wherein.

DESCRIPTION OF THE PREFERRED EMBODIMENTS

Figure 1:
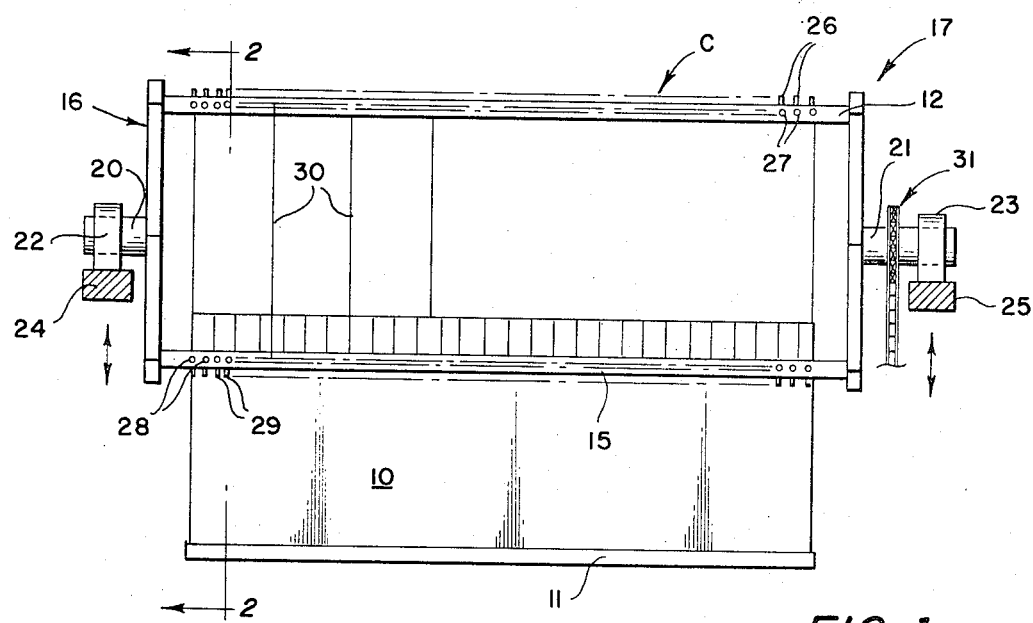
FIG. 1 is a side view of a presently preferred embodiment of the present invention wherein vertical division of a block mass is effected.
Figure 2:
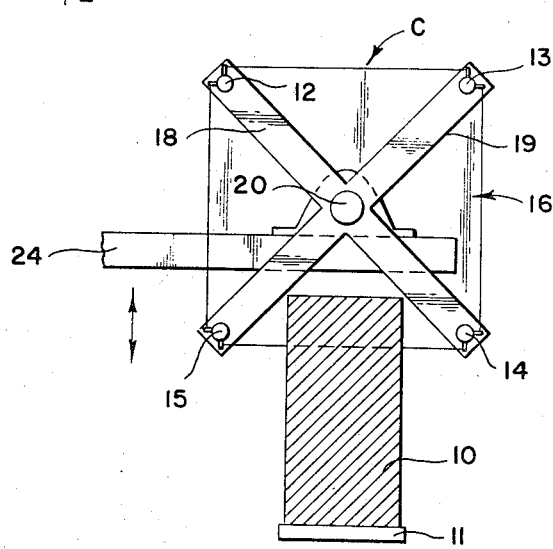
FIG. 2 is a section view taken generally along line 2—2 of FIG. 1.

Referring to FIGS. 1 and 2, a block of lightweight concrete generally denoted 10 is supported on a horizontal bed 11. Both bed 11 and block 10 remain stationary during the cutting operation. In accordance with the present invention the cutting apparatus comprises a rotatable cage generally denoted C which includes four parallel bar members 12, 13, 14 and 15 mounted in end supports generally denoted 16 and 17. End supports 16 and 17 each comprise a cross-member formed by a pair of mutually perpendicular girders 18 and 19 arranged as shown. Short shaft members 20 and 21 extending into centrally located bores in end supports 16 and 17 provide rotation for the cage C. Shafts 20 and 21 are suitably mounted in bearings 22 and 23 and shaft 21 is driven through a sprocket and chain arrangement generally denoted 31 connected to a drive motor (not shown).

Each of the four bars 12 to 15 include two series or rows of wire support members (support members 26 and 27 of bar 12 and support members 28 and 29 of bar 15 being shown in FIG. 1). As described hereinbefore the support members may comprise knob-like elements extending perpendicularly outward from the surface of the bars. As shown, the two series or sets of knobs on each bar are arranged mutually perpendicular to each other and one of the sets together with a corresponding set on an adjacent bar provides means for clamping the cutting wires 30 between the adjacent bars. For example, support members 27 and 28 clamp cutting wires 30 between bars 12 and 15 (FIG. 1). The support members are shown as knobs or studs in the figures of the drawing but in actual practice the support members also include springs which provide resilient, flexible clamping of the cutting wires. As was set forth hereinbefore because the great multiplicity of support members provided the spacings between the wires 30 may be varied greatly. This spacing is of course varied for each cutting frame. For example, in contrast to the rather wide spacing between the wires of the frame formed by bars 12 and 15, the wires of the frame formed by bars 12 and 13 could be fixed between every opposing pair of support members thus providing very thin division of the block 10.

The cutting frame cage C may also be provided with sawing wires in contrast to the tightly stretched cutting wires 30 shown. In this embodiment the four parallel bars 12 to 15 would not be rigidly affixed to the end supports 16 and 17 but rather two of the diametrically opposed bars, for example, bars 12 and 14 would be mounted for rotation in the end supports. The cutting wires 30 would be fixed to the non-rotatable bars 13, 15 through spring members and would be fixed to the rotatable bars 12 and 14 such that the cutting wires could be wound approximately a quarter of a turn about the rotatable bars. Further, alternate wires would be fixed to the upper and the under sides of the turnable bars. With this arrangement oscillation of the rotatable bars through a complete turn and then back to their original positions would be reflected in a longitudinal reciprocal movement of the cutting wires. Reference is made to Swedish Pat. 134,271 for further details of such a sawing wire arrangement.

Regarding the operation of the cutting apparatus of FIGS. 1 and 2 it is noted that block 10 together with bed 11 initially lie below rotatable cutting cage C. Cage C is rotated until a cutting frame having the desired spacing of the cutting wires 30 is brought to a horizontal position above the upper surface of block 10. Rotation is effected through means of a drive motor (not shown) as set forth hereinbefore. The entire cage arrangement is mounted on a vertically movable mounting arrangement which includes parallel arms 24 and 25. When the selected set of wires 30 has been moved to the cutting position, i.e., a horizontal position just above cutting block 10, arms 24 and 25 are lowered and the horizontal wires 30 will cut through the block 10 downwardly from the upper surface thereof. Lowering of the arms 24, 25 continues until the wires 30 have reached the bottom surface of the block 10 after which the entire cutting frame cage C is raised by arms 24 and 25 thus causing the wires 30 to pass in a reversed direction through the previously made cuts. FIGS. 1 and 2 show the cutting wire cage C at an intermediate position in a downward pass through block 10.

When the next block is ready for division the cage C may be then rotated, if necessary, to position one of the remaining three cutting frames in the cutting position just above and parallel to the upper surface of this block. It will, of course, be appreciated that the cutting apparatus shown in FIGS. 1 and 2 provides four different spacings of cutting wires. Further, it will be noted that if it is necessary to repost the wires of any of the cutting frames the arrangement of the present invention provides added time for such a purpose. Assuming that, for example, one of the frames is in an idle or non-cutting position for at least three cycles after use it is possible to use the time remaining in the cycles after cutting has been accomplished for a reposting operation. Thus the present invention in addition to providing a number of different spacings of the cutting frame provides additional time for reposting where the spacings of the frames provided do not meet the needs of the units to be prepared.

Figure 3:
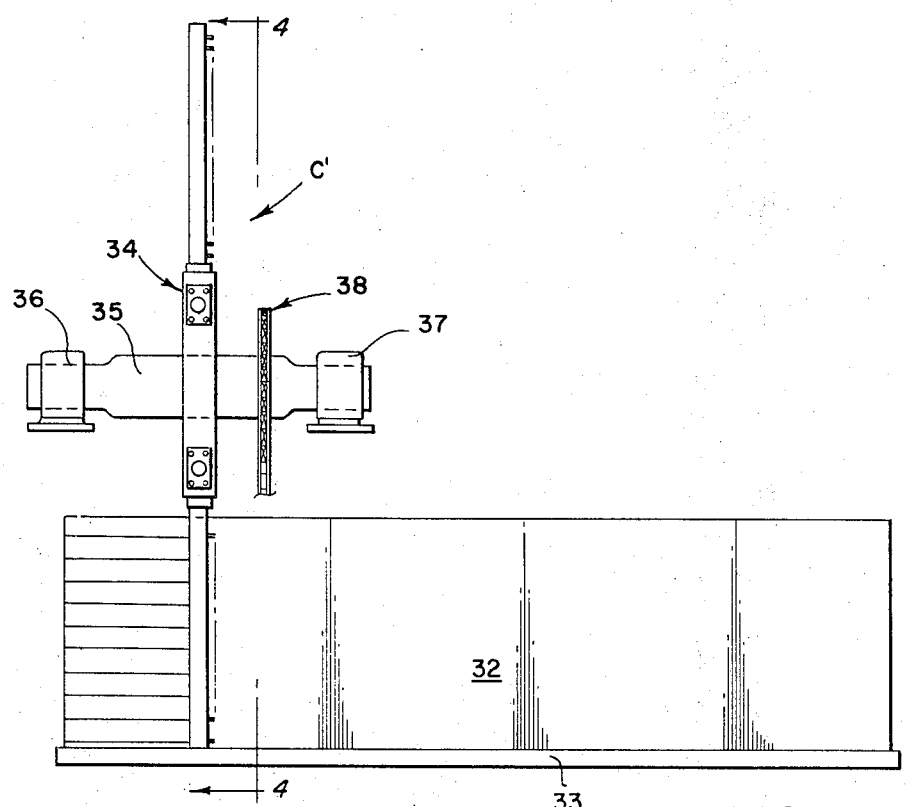
FIG. 3 is a side view of a second preferred embodiment of the invention wherein a mass block is arranged for horizontal division.
Figure 4:
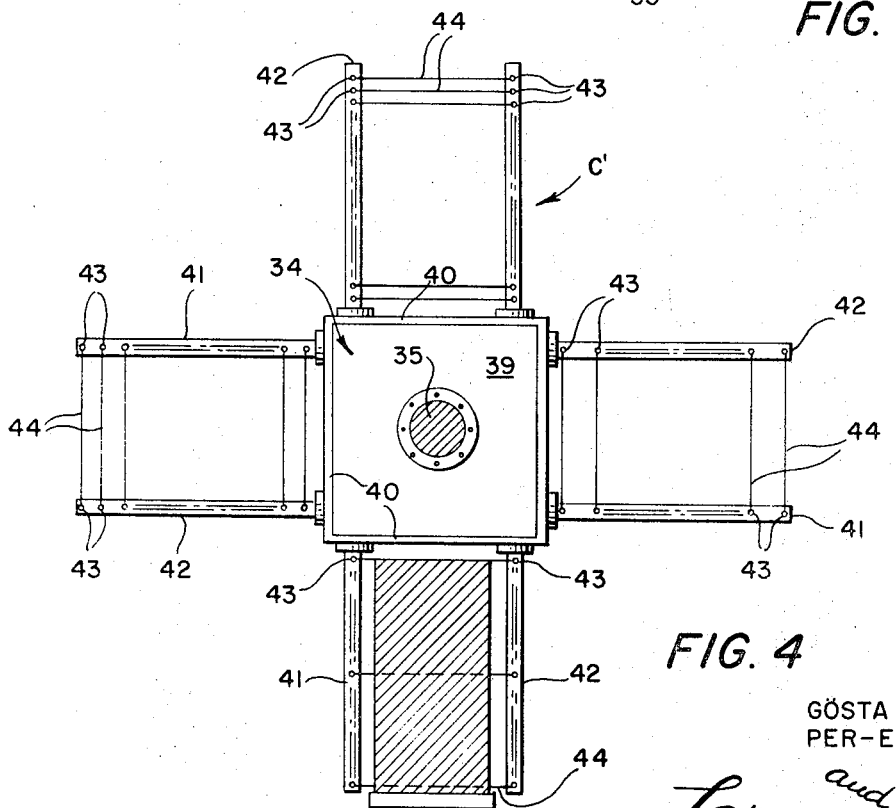
FIG. 4 is a sectional view taken generally along lines 4—4 of FIG. 3.

Referring to FIGS. 3 and 4, a block of lightweight concrete generally denoted 32 is positioned on a movable bed 33 for delivery to a stationary cutting frame arrangement denoted C'. Thus in this arrangement, contrary to the arrangement of FIGS. 1 and 2, the block 32 is moved relative to the cutting frames C' and thus the operation is the inverse of that previously described. In the arrangement of FIGS. 3 and 4, four cutting frames extend perpendicularly outward of a support generally denoted 34. Support 34 is rotatable about a shaft 35 which extends perpendicularly to the plane of support 34 through a centrally located bore therein. Shaft 35 is fitted in bearings 36 and 37 located at opposite ends of the shaft and is driven through a sprocket chain arrangement generally denoted 38 connected to a drive motor (not shown). The support 34 comprises a square relatively thick metal sheet member 39. Four flange sheets 40 are welded onto the edges of the square support 34. A pair of spaced parallel bars 41 and 42 extend perpendicularly outwardly of each of the flange sheets 40 to form cutting frames. The length of the bars 41, 42 is somewhat greater than the height of the mass block 32 so that the cutting frames are able to operate over the entire height of the block 32. Similarly to the embodiment of FIGS. 1 and 2 a series of spaced parallel wires 44 extend between bar members 41 and 42. The cutting wires are clamped between parallel rows of support members shown in the form of studs or knobs 43 which extend perpendicularly upward of bar members 41, 42 and which are spaced in a straight line every approximately five millimeters along the length of the bars. As described hereinabove the spacing of the wires for each cutting frame is different so that four different sized building units may be produced.

In the operation of the device of FIGS. 3 and 4 the cutting frames are initially rotated so that a frame having a desired wire spacing is positioned parallel to and adjacent the mass block 32. In this position the bars 41, 42 extend vertically downward from the support member 34 and the cutting wires 44 extend horizontally. The position of the cutting frames is then maintained while longitudinal movement is imparted to the mass block 32. The cutting wires will cut through the block from the front end surface to the rear end surface and divide the block into horizontal layers.

It is noted that the embodiments shown could be used in combination, with vertical cuts being made with the cutting arrangement of FIGS. 1 and 2 and horizonal cuts being made with the arrangement of FIGS. 3 and 4. Further, the arrangements shown may be combined with other cutting arrangements. For example, two horizontally movable frames may alternatively be brought into engagement with the mass block being divided. Reference is made to Swedish Pat. 168,148 for the details of such a system.

It will be appreciated from the foregoing that the present invention provides a number of advantages, the most important of which is the reduction of the number of repostings required. This feature enables the arrangement to be used in an automated or semiautomated production line system. Further, as set forth above the time available for reposting where necessary is multiplied by the use of the arrangement of the present invention. With the embodiment of FIGS. 1 and 2 reposting can take place at least during the time which the frames remain fixed while in the arrangement of FIGS. 3 and 4 reposting of the wires in the horizontal frames and perhaps in the idle vertical frame may take place at the same time as the mass block is passing through the lower vertically oriented frame.

It will be understood that the number of cutting frames utilized is a matter of choice of design as long as two or more frames are employed. It is perhaps preferable to use at least three cutting frames in that this arrangement will also multiply the reposting time as set forth hereinbefore.

It will be further understood by those skilled in the art that the embodiment of the invention shown and described herein are subject to modification without departing from the scope and spirit of the invention. Accordingly, it should be understood that the invention is not limited by the exemplary embodiments shown and described but rather only by the subjoined claims.

We claim:
1. An arrangement for cutting blocks of material into smaller sizes comprising, a plurality of cutting devices, each of said cutting devices comprising a plurality of cutting wires and means for supporting said wires in predetermined spaced relationship, the spacing between the wires of at least one of said cutting devices being different from the spacing between the cutting wires of at least one further cutting device, the cutting wires of each cutting device lying in a plane perpendicular to the axis of rotation of said cutting devices, and means for rotatably mounting said cutting devices whereby a cutting device having cutting wires of a selected predetermined spacing may be rotated into an operative cutting position.

2. A cutting arrangement in accordance with claim 1 wherein said cutting devices each comprise a pair of spaced parallel bar members for supporting the cutting wires in parallel relationship therebetween.

3. A cutting arrangement in accordance with claim 2 wherein each cutting device comprises a cutting frame including a pair of spaced parallel elongate bar members and a plurality of cutting wire support members mounted in rows along the lengths of said bar members 4. A cutting arrangement in accordance with claim 1 wherein the means for mounting said cutting devices comprises a central shaft-driven hub, said cutting devices extending radially outward from said hub.

5. A cutting arrangement in accordance with claim 1 wherein said cutting devices remaining stationary during the cutting operation.

6. A cutting arrangement in accordance with claim 1 wherein said plurality is at least four.

7. An arrangement for cutting blocks of material into smaller sizes comprising, a plurality of cutting devices, each of said cutting devices comprising a plurality of cutting wires and means for supporting said wires in predetermined spaced relationship, the spacing between the wires of at least one of said cutting devices being different from the spacing between the cutting wires of at least one further cutting device, the cutting wires of each cutting device lying in a common plane and the planes of the cutting wires of different devices being different and being individually parallel to the axis of rotation of said cutting devices, each of said cutting devices including a cutting frame including a pair of spaced parallel elongate bar members and first and second rows of individual cutting wire support members mounted along the length of each of said bar members for supporting the cutting wires therebetween, and means for rotatably mounting said cutting devices whereby a cutting device having cutting wires of a selected predetermined spacing may be rotated into an operative cutting poistion.

8. A cutting arrangement in accordance with claim 7 wherein the means for rotatably mounting said cutting frames comprises a pair of shaft driven end supports located at opposite ends of said bar members.

9. A cutting arrangement in accordance with claim 7 wherein each of said cutting devices is movable in a direction perpendicular to the plane thereof to effect cutting.

References Cited
UNITED STATES PATENTS
| | | | |
|---|---|---|---|
| 2,131,562 | 9/1938 | King | 25—109 |
| 3,088,186 | 5/1963 | Mennitt | 25—112 |

FOREIGN PATENTS
| | | |
|---|---|---|
| 88,591 | 1956 | Norway. |

WILLIAM S. LAWSON, Primary Examiner

J. F. COAN, Assistant Examiner

U.S. Cl. X.R.

25—112; 31—22, 23; 83—620, 564

UNITED STATES PATENT OFFICE
CERTIFICATE OF CORRECTION

Patent No. 3,538,562            Dated     November 10, 1970

Inventor(s)     Gosta Ekstedt et al.

It is certified that error appears in the above-identified patent and that said Letters Patent are hereby corrected as shown below:

In the heading to the printed specification, lines 4 and 5, "Ytong International AB," should read -- Intong Aktiebolag Signed and sealed this 23rd day of March 1971.

(SEAL)
Attest:

EDWARD M. FLETCHER, JR.             WILLIAM E. SCHUYLER, J
Attesting Officer                       Commissioner of Patent